United States Patent [19]
Tiedemann et al.

[11] 3,726,963
[45] Apr. 10, 1973

[54] PRODUCTION OF BARIUM CARBONATE FROM BARIUM SULFATE

[75] Inventors: Jens Tiedemann, Hurth-Burbach; Heinz Harnisch, Lovenich, both of Germany

[73] Assignee: Knapsack Aktiengesellschaft, Knapsack near Cologne, Germany

[22] Filed: Mar. 30, 1971

[21] Appl. No.: 129,579

[30] Foreign Application Priority Data

May 2, 1970 Germany..................P 20 21 662.0

[52] U.S. Cl................................................423/431
[51] Int. Cl..............................................C01f 11/18
[58] Field of Search...................23/66; 423/430, 431

[56] References Cited

UNITED STATES PATENTS

| | | | |
|---|---|---|---|
| 2,440,641 | 4/1948 | Minnick | 23/66 |
| 3,322,683 | 5/1967 | Lester | 23/66 X |
| 3,304,155 | 2/1967 | Zimgiebl | 23/66 |

Primary Examiner—Oscar R. Vertiz
Assistant Examiner—Charles B. Rodman
Attorney—Connolly and Hutz

[57] ABSTRACT

Production of barium carbonate by treatment of barium sulfate with an excess of an aqueous sodium carbonate solution under pressure and at temperatures higher than 100° C. The starting material is an aqueous barium sulfate suspension which contains sodium carbonate together with a phosphorus compound dissolved therein.

6 Claims, No Drawings

PRODUCTION OF BARIUM CARBONATE FROM BARIUM SULFATE

The present invention relates to the production of barium carbonate by treatment of barium sulfate with an excess of an aqueous sodium carbonate solution under pressure and at temperatures higher than 100°C.

The purification of crude phosphoric acids, which are obtained by processing phosphate ores with sulfuric acid and are commonly known as so-called "wet-processed phosphoric acids," entails the formation of relatively large quantities of barium sulfate, which was previously required to be rejected, for lack of utility.

Various processes for the transformation of barium sulfate into barium carbonate have already been described. Commercial processes comprise more particularly reducing heavy spar by means of carbon to give barium sulfide and reacting the latter with carbon dioxide to produce barium carbonate. It has also been suggested earlier that barium sulfate be treated in an autoclave with an excess of sodium carbonate in aqueous solution at temperatures higher than 100° C and transformed into barium carbonate.

Especially this latter process is not fully satisfactory as relatively large amounts of sodium carbonate (more than a 2–10 molar excess, based on barium sulfate) are required to be used for yields of up to substantially 80 percent.

This heavy expenditure of chemicals significantly affects the economy of this process.

We have now discovered that 5 to 10 percent higher yields of processed barium are produced by reacting barium sulfate with a sodium carbonate solution under pressure at temperatures higher than 100° C, provided that the starting material is an aqueous barium sulfate suspension containing sodium carbonate together with a phosphorus compound, which is dissolved therein.

The barium sulfate suspension should preferably contain barium sulfate and sodium carbonate in a molar ratio of between 1:2 and 1:1.5, more preferably 1:1.75, and between 10 and 20 weight percent of a water-soluble phosphorus compound, calculated as $P_2O_5$ and based on $BaSO_4$.

Barium sulfate filter sludge, which is obtained upon the purification of crude phosphoric acid produced by wet-processing treatment of phosphate ores with sulfuric acid, is a very useful starting material in the process of the present invention.

The barium sulfate should conveniently be suspended in a sodium carbonate solution containing between 100 and 400 grams sodium carbonate per liter, preferably 200 grams sodium carbonate per liter.

The useful soluble phosphorus compounds include phosphoric acid or orthophosphates, for example.

By subjecting barium sulfate to the processing treatment described hereinabove, the overall quantity of initially water-soluble phosphate is recovered in the form of difficultly soluble barium phosphate. In other words, a mixture of barium carbonate with barium phosphate is obtained. It should be mentioned here that only minor yields are produced if barium sulfate is rendered soluble in a sodium phosphate solution in the absence of sodium carbonate. The increased yields obtained by treatment with sodium carbonate in the presence of phosphate presumably are a result of the fact that a barium carbonate proportion, which primarily is in equilibrium with barium sulfate, is secondarily withdrawn from that equilibrium with the resultant formation of barium phosphate, followed by further formation of barium carbonate. A barium phosphate and carbonate are soluble in mineral acids, it is equally possible to use the mixture so made for the precipitation of sulfate in the purification of "wet-processed phosphoric acids."

It has already been mentioned that barium sulfate filter sludge, such as that which is obtained in the purification of wet-processed phosphoric acids, is a starting material very useful for the production of barium carbonate or barium carbonate/barium phosphate-mixtures in accordance with the present invention. This sludge generally comprises the following principal constituents:

| | | |
|---|---|---|
| Adhering water at 120°C | 25% | |
| Ba | 43% | material dried at 120° |
| $SO_4$ | 32% | " |
| $P_2O_5$ (total amount) | 14% | " |
| $P_2O_5$ (water-soluble) | 12% | " |

The orthophosphoric acid adhering to the above filter sludge enables it to be used without any prior treatment in an autoclave and rendered soluble therein under pressure. The addition of further phosphoric acid could not be found to produce beneficial operational effects as the suspension is relatively difficult to work up, because of the relatively minor solubility of disodium phosphate (crystallization on filter).

EXAMPLE 1: (Comparative Example)

1 kg filter-moist barium sulfate sludge coming from the purification of wet-processed phosphoric acid ($BaSO_4$-content = 85.2 weight percent, based on the dry substance), which was washed free from soluble phosphorum compounds, was suspended in 2.88 liters of water and mixed with 622 grams of sodium carbonate ($Na_2CO_3$:$BaSO_4$ -molar ratio = 2:1). The suspension was placed in a stainless steel agitator autoclave and maintained therein at 200° C, for 15 minutes. 80.3 percent of the barium sulfate was found to have been rendered soluble.

EXAMPLE 2

1 kg of unwashed, filter-moist barium sulfate sludge coming from the purification of wet-processed phosphoric acid ($BaSO_4$- content = 75.0 weight percent, based on the dry substance), which contained 16.0 weight percent of $P_2O_5$ (based on $BaSO_4$) in the form of water-soluble phosphorus compounds was suspended in 2.48 liters of water. The resulting suspension was neutralized to establish a pH of 7 by the addition of sodium hydroxide solution, and mixed with 546 grams of sodium carbonate ($Na_2CO_3$:$BaSO_4$ -molar ratio = 2.1). The suspension was placed in a stainless steel agitator autoclave and maintained therein at 200° C, for 15 minutes. 90.4 percent of the barium sulfate was found to have been rendered soluble.

EXAMPLE 3

1 kg of unwashed, filter-moist barium sulfate sludge coming from the purification of wet-processed phosphoric acid ($BaSO_4$-content = 75.0 weight percent, based on the dry substance) which contained 16.0 weight percent of $P_2O_5$ (based on $BaSO_4$) in the form of water-soluble phosphorus compounds, was suspended in 207 liter of water. The resulting suspension was neutralized to establish a pH of 7 by the addition of sodium hydroxide solution, and mixed with 464 grams of sodium carbonate ($Na_2CO_3$:$BaSO_4$-molar ratio = 1.7:1). The suspension was placed in a stainless steel agitator autoclave and maintained therein at 200° C, for 15 minutes. 89.2 percent of the barium sulfate was found to have been rendered soluble.

We claim:

1. A process for the manufacture of barium carbonate by treatment of barium sulfate with an excess of an aqueous sodium carbonate solution, under pressure and at temperatures higher than 100° C, which comprises using as a starting material an aqueous barium sulfate suspension containing sodium carbonate together with between 10.0 and 20.0 weight percent of a water-soluble phosphorus compound, calculated as $P_2O_5$ and based on $BaSO_4$, which is dissolved therein, said phosphorus compound being selected from the group consisting of phosphoric acid and orthophosphates.

2. The process as claimed in claim 1, wherein the said barium sulfate suspension contains barium sulfate and sodium carbonate in a molar ratio of between 1:2 and 1:1.5.

3. The process as claimed in claim 2, wherein the said barium sulfate suspension contains barium sulfate and sodium carbonate in the molar ratio of 1:1.75.

4. The process as claimed in claim 1, wherein the said starting material is a barium sulfate filter sludge obtained in the purification of phosphoric acids, which are produced by wet-processing treatment of phosphate ores with sulfuric acid.

5. The process as claimed in claim 1, wherein the said barium sulfate is suspended in a sodium carbonate solution containing between 100 and 400 grams sodium carbonate per liter.

6. The process as claimed in claim 5, wherein the said sodium carbonate solution contains 200 grams sodium carbonate per liter.

* * * * *